(12) United States Patent
Luo et al.

(10) Patent No.: US 12,483,320 B2
(45) Date of Patent: Nov. 25, 2025

(54) COMMUNICATION METHOD AND APPARATUS

(71) Applicant: HUAWEI TECHNOLOGIES CO., LTD., Guangdong (CN)

(72) Inventors: Hejia Luo, Hangzhou (CN); Xiaolu Wang, Hangzhou (CN); Ying Chen, Hangzhou (CN); Jianwei Zhou, Hangzhou (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 554 days.

(21) Appl. No.: 17/961,812

(22) Filed: Oct. 7, 2022

(65) Prior Publication Data
US 2023/0037135 A1 Feb. 2, 2023

Related U.S. Application Data

(63) Continuation of application No. PCT/CN2021/083638, filed on Mar. 29, 2021.

(30) Foreign Application Priority Data

Apr. 10, 2020 (CN) .......................... 202010280505.3

(51) Int. Cl.
*H04B 7/185* (2006.01)
*H04W 12/037* (2021.01)
(Continued)

(52) U.S. Cl.
CPC ...... *H04B 7/18513* (2013.01); *H04W 12/037* (2021.01); *H04W 36/322* (2023.05);
(Continued)

(58) Field of Classification Search
CPC ............ H04B 7/18513; H04B 7/18541; H04B 7/1851; H04B 7/18519; H04W 12/037;
(Continued)

(56) References Cited

U.S. PATENT DOCUMENTS 5,390,124 A * 2/1995 Kyrtsos ................ G05D 1/0278
701/470
5,796,365 A * 8/1998 Lewis ................... G01S 19/071
343/712

(Continued)

FOREIGN PATENT DOCUMENTS

| CN | 103037500 A | 4/2013 |
|----|-------------|--------|
| CN | 104570024 A | 4/2015 |
| JP | 2014042111 A | 3/2014 |

OTHER PUBLICATIONS

Ericsson:"Ephemeris data", 3GPP Draft; R2-1914195 Ephemeris Data_MeetingRev, 3rd Generation Partnership Project (3GPP), Mobile Competence Centre; 650, Route Des Lucioles; F-06921Sophia-Antipolis Cedex; France, vol. RAN WG2, No. Chongqing, China; Oct. 14, 2019-Oct. 18, 2019 Oct. 18, 2019 (Oct. 18, 2019), XP051797961.
(Continued)

*Primary Examiner* — Amancio Gonzalez

(57) ABSTRACT

A communication method and apparatus are provided, and relate to the field of wireless communication technologies, to resolve a problem in a conventional technology that communication quality during communication between a satellite and a communication apparatus cannot be ensured, and to ensure security of high-accuracy location information of the satellite. In the method, the communication apparatus may perform random access to the satellite based on first location information. The communication apparatus may perform uplink communication with the satellite based on obtained second location information. Accuracy of a loca-
(Continued)

tion obtained based on the second location information is higher than accuracy of a location obtained based on the first location information. Based on this solution, required accuracy of location information of the satellite is different.

18 Claims, 6 Drawing Sheets

(51) Int. Cl.
  *H04W 36/32* (2009.01)
  *H04W 74/0833* (2024.01)
  *H04W 74/0836* (2024.01)
(52) U.S. Cl.
  CPC ..... *H04W 36/328* (2023.05); *H04W 74/0833* (2013.01); *H04W 74/0836* (2024.01)
(58) Field of Classification Search
  CPC ............. H04W 36/322; H04W 36/328; H04W 74/0833; H04W 36/302; H04W 74/0836; H04W 36/083; H04W 4/025; H04W 12/03
  USPC ........................................................ 370/316
  See application file for complete search history.

(56) References Cited

U.S. PATENT DOCUMENTS

| | | | | |
|---|---|---|---|---|
| 6,127,967 A * | 10/2000 | Ghazvinian | ........ | H04B 7/18532 342/359 |
| 6,332,069 B1 * | 12/2001 | Zhao | .................... | H04B 7/2041 455/12.1 |
| 6,377,208 B2 * | 4/2002 | Chang | .................... | G01S 13/878 342/357.43 |
| 6,429,812 B1 * | 8/2002 | Hoffberg | ............ | H04B 7/18576 701/484 |
| 6,563,457 B2 * | 5/2003 | Chang | .................... | G01S 19/46 342/353 |
| 6,665,541 B1 * | 12/2003 | Krasner | .................. | G01S 11/08 342/357.42 |
| 6,671,620 B1 * | 12/2003 | Garin | ...................... | G01S 19/09 701/484 |
| 6,727,849 B1 * | 4/2004 | Kirk | ......................... | G01S 19/44 342/464 |
| 6,732,051 B1 * | 5/2004 | Kirk | ....................... | G01S 19/485 701/472 |
| 6,950,059 B2 * | 9/2005 | Rapoport | ................ | G01S 19/04 342/357.27 |
| 6,972,551 B2 * | 12/2005 | Havener | .............. | H05H 1/0012 324/71.3 |
| 7,019,687 B1 * | 3/2006 | Schempp | ................ | G01S 19/02 342/357.395 |
| 7,151,929 B1 * | 12/2006 | Jenkin | ................ | H04B 7/18582 455/430 |
| 7,268,700 B1 * | 9/2007 | Hoffberg | ................ | G06Q 50/01 340/995.13 |
| 7,271,737 B1 * | 9/2007 | Hoffberg | .............. | G08G 1/0104 701/119 |
| 7,298,289 B1 * | 11/2007 | Hoffberg | ................ | G08G 1/127 340/995.13 |
| 7,619,559 B2 * | 11/2009 | DiEsposti | ............... | G01S 19/05 342/357.42 |
| 7,623,069 B2 * | 11/2009 | Mitsunaga | .............. | G01S 19/20 342/357.29 |
| 7,809,370 B2 * | 10/2010 | Stolte | ................. | H04B 7/18513 455/427 |
| 8,081,111 B2 * | 12/2011 | Haworth | .................. | H04K 3/90 342/451 |
| 8,085,191 B2 * | 12/2011 | Green | .................... | G01S 19/426 342/357.31 |
| 8,138,972 B2 * | 3/2012 | Underbrink | ............ | H04B 1/707 342/357.63 |
| 8,274,430 B2 * | 9/2012 | Garin | .................... | G01S 19/258 342/357.66 |
| 8,369,772 B2 * | 2/2013 | Petruzzelli | ......... | H04N 21/4382 455/12.1 |
| 8,593,345 B2 * | 11/2013 | Underbrink | ............. | G01S 19/24 342/357.72 |
| 9,049,985 B2 * | 6/2015 | Feher | ..................... | H04L 5/1453 |
| 9,261,599 B1 * | 2/2016 | Golden | .................. | G01S 19/23 |
| 9,669,926 B2 * | 6/2017 | Levien | .................... | G08G 5/55 |
| 9,733,338 B1 * | 8/2017 | Kuo | ........................ | G01S 3/465 |
| 9,876,529 B2 * | 1/2018 | Turner | ............... | H04B 7/18523 |
| 9,903,952 B2 * | 2/2018 | Gentry | .................... | G01S 19/41 |
| 9,910,159 B2 * | 3/2018 | Chan | .................... | G01S 19/05 |
| 9,927,807 B1 * | 3/2018 | Ganjoo | .................. | G08G 5/26 |
| 10,018,727 B2 * | 7/2018 | Hwang | .................. | G01S 19/49 |
| 10,095,241 B2 * | 10/2018 | Nakagawa | .......... | G05D 1/0293 |
| 10,182,268 B2 * | 1/2019 | Kitahara | ................ | H04N 21/84 |
| 10,264,509 B2 * | 4/2019 | Torres | .................. | H04W 40/20 |
| 10,395,185 B2 * | 8/2019 | Dick | ...................... | G06Q 10/00 |
| 10,564,292 B2 * | 2/2020 | Rautalin | ................ | G01S 19/40 |
| 10,873,136 B1 * | 12/2020 | Struhsaker | ........... | H01Q 21/065 |
| 10,884,132 B1 * | 1/2021 | Judd | ........................ | G01S 19/42 |
| 10,912,056 B2 * | 2/2021 | Eisner | .................... | H04W 4/02 |
| 10,955,559 B2 * | 3/2021 | Yu | .............................. | G01S 19/21 |
| 11,089,441 B2 * | 8/2021 | Eisner | .................... | H04W 4/029 |
| 11,089,562 B2 * | 8/2021 | Pascolini | ............... | G01S 19/421 |
| 11,237,275 B2 * | 2/2022 | Sato | ....................... | G01S 19/071 |
| 11,329,875 B2 * | 5/2022 | Whitefield | .......... | H04L 41/0896 |
| 11,341,742 B2 * | 5/2022 | Sohn | ........................ | G01S 5/021 |
| 11,412,364 B2 * | 8/2022 | Eisner | .................... | H04W 4/02 |
| 11,754,722 B2 * | 9/2023 | Miyamoto | ............ | G01S 19/396 342/357.45 |
| 11,762,100 B2 * | 9/2023 | Miyamoto | ................ | G01S 5/01 342/357.45 |
| 11,810,116 B2 * | 11/2023 | Prakash | ............. | G06Q 20/3224 |
| 11,832,283 B2 * | 11/2023 | Khoshnevisan | ...... | H04L 1/1819 |
| 12,021,299 B2 * | 6/2024 | Diamond | ................. | H01Q 3/08 |
| 12,028,908 B2 * | 7/2024 | Bienas | ............. | H04W 74/0841 |
| 12,032,071 B2 * | 7/2024 | Reis | ........................ | G01S 19/215 |
| 12,061,273 B2 * | 8/2024 | Rautalin | ................ | G01S 19/05 |
| 12,130,371 B2 * | 10/2024 | Huang | ...................... | G01C 17/00 |
| 12,140,686 B2 * | 11/2024 | van Diggelen | ....... | G01S 19/428 |
| 12,212,491 B2 * | 1/2025 | Atwal | ............... | H04B 7/18519 |
| 2005/0068229 A1 * | 3/2005 | Moilanen | ................ | G01S 19/06 342/357.42 |
| 2005/0215267 A1 * | 9/2005 | Cartmell | .............. | G08G 1/0962 455/456.1 |
| 2005/0280576 A1 * | 12/2005 | Shemesh | ................ | G01S 19/34 342/464 |
| 2006/0135124 A1 * | 6/2006 | Kaneko | .................. | H04L 63/107 455/411 |
| 2007/0171124 A1 | 7/2007 | Weill | | |
| 2011/0025555 A1 * | 2/2011 | Whitehead | .............. | G01S 19/41 342/357.24 |
| 2011/0306362 A1 * | 12/2011 | Huang | .................... | G01S 19/05 455/456.1 |
| 2015/0070211 A1 * | 3/2015 | Cheng | .................... | G01S 19/27 342/357.51 |
| 2015/0260850 A1 * | 9/2015 | Deng | ...................... | G01S 19/17 342/357.25 |
| 2016/0302043 A1 * | 10/2016 | Laws | ..................... | H04L 69/085 |
| 2017/0285178 A1 * | 10/2017 | Platzer | .................. | G01S 19/45 |
| 2018/0152235 A1 * | 5/2018 | Smoot | .................. | H04B 7/1851 |
| 2020/0262589 A1 * | 8/2020 | Turner | ................. | B64G 1/1078 |
| 2021/0209955 A1 * | 7/2021 | Fan | .......................... | G08G 5/26 |

OTHER PUBLICATIONS

3GPP TS 36.355 V12.0.0, 3rd Generation Partnership Project; Technical Specification Group Radio Access Network; Evolved Universal Terrestrial Radio Access (E-UTRA); LTE Positioning Protocol (LPP) (Release 12), Dec. 2013. total 126 pages.

ZTE Corporation et al: "Consideration on ephemeris data handling", 3GPP Draft; R2-1915085, 3rd Generation Partnership-Project (3GPP), Mobile Competence Centre; 650, Route DesLucioles; F-06921 Sophia-Antipolis Cedex; France, vol. RAN WG2, No.

(56) References Cited

OTHER PUBLICATIONS

Reno, USA; Nov. 18, 2019-Nov. 22, 2019 Nov. 8, 2019(Nov. 8, 2019), XP051817005.
Extended European Search Report issued in EP21785273.0, dated Aug. 21, 2023, 16 pages.
Notice of Allowance issued in CN202010280505.3, dated Jun. 22, 2022, 4 pages.

* cited by examiner

COMMUNICATION METHOD AND APPARATUS

CROSS-REFERENCE TO RELATED APPLICATIONS

This application is a continuation of International Patent Application No. PCT/CN2021/083638, filed on Mar. 29, 2021, which claims priority to Chinese Patent Application No. 202010280505.3, filed on Apr. 10, 2020. The disclosures of the aforementioned applications are hereby incorporated by reference in their entireties.

TECHNICAL FIELD

This application relates to the field of communication technologies, and in particular, to a communication method and an apparatus.

BACKGROUND

In some satellite-based communication or positioning services, location information and motion information of a satellite need to be notified to user equipment (UE). The location information and motion information of the satellite may be used by the UE to position the UE. When the UE communicates with the satellite, time-frequency compensation is performed on a to-be-sent signal.

The location information and motion information of the satellite are publicly recorded in an international organization for coordination and management of spatial resources. However, accuracy of the location information and motion information of the satellite recorded in the international organization is low, and a difference from an actual location of the satellite may reach tens of kilometers. The UE can obtain the low-accuracy location information and motion information of the satellite by using broadcast signaling of the satellite. However, the low-accuracy location information and motion information cannot meet requirements of the UE for positioning and communication.

The accuracy of the location information and motion information of the satellite is strongly related to a device, weather, a measurement and control algorithm, and the like. As a result, it is difficult to obtain high-accuracy location information and motion information of the satellite. Currently, the high-accuracy location information and motion information of the satellite are maintained and managed by an organization operating the satellite, and are unavailable to the public in real time.

SUMMARY

Embodiments of this application provide a communication method and apparatus, to resolve a problem in a conventional technology that communication quality during communication between a satellite and a communication apparatus cannot be ensured, and a problem in a conventional technology that high-accuracy location information of the satellite is obtained by any communication apparatus.

According to a first aspect, an embodiment of this application provides a communication method. The method may be performed by a communication apparatus provided in this embodiment. In the method, the communication apparatus obtains first location information sent by a satellite. The first location information herein may be location information and motion information of the satellite. The motion information may be a motion velocity and a motion direction of the satellite. The communication apparatus can perform random access to the satellite based on the first location information. The communication apparatus can further obtain second location information of the satellite, and perform uplink communication with the satellite based on the second location information. It should be noted that, accuracy of a location obtained based on the second location information is higher than accuracy of a location obtained based on the first location information.

For example, the communication apparatus can obtain location information and motion information of the satellite based on the second location information. The communication apparatus can further obtain location information and motion information of the satellite based on the second location information and the first location information.

Based on this solution, because in different processes in which the communication apparatus communicates with the satellite, required accuracy of location information and motion information of the satellite is different, the location information and motion information of the satellite may be distinguished in terms of different accuracy. In different processes of communicating with the satellite, the communication apparatus can obtain the location information and motion information of the satellite with different accuracy, and communicate with the satellite. In this way, when the communication apparatus performs uplink communication with the satellite, accuracy of a time-frequency location can be met, and a problem that high-accuracy location information and motion information of the satellite can be obtained by any communication apparatus can be avoided.

In a possible implementation, the first location information includes a basic orbital parameter of the satellite, or the first location information includes a basic orbital parameter and a perturbation parameter of the satellite. For example, the first location information may include a Kepler orbit parameter in a satellite ephemeris, or may include a parameter reflecting satellite perturbation.

Based on this solution, the communication apparatus may determine location information and motion information of the satellite based on the basic orbital parameter and the perturbation parameter, and perform random access to the satellite based on the determined location information and motion information.

In a possible implementation, the second location information may be a correction parameter, where the correction parameter is used to correct the first location information. For example, the second location information may be an incremental update parameter for the first location information. The communication apparatus can correct the first location information based on the correction parameter, to obtain high-accuracy location information and motion information of the satellite.

Based on this solution, the second location information may be the correction parameter, an amount of transmitted data may be reduced, and it is also simple for the communication apparatus to calculate the location information and motion information of the satellite.

In a possible implementation, the first location information and the second location information are sent at a same moment, or the first location information and the second location information are sent at different moments. In an example, the first location information and the second location information that is encrypted by using a first key may be sent to the communication apparatus at a same moment. Alternatively, the first location information and the second location information that is encrypted by using the first key may be sent to the communication apparatus at different moments. For example, before the communication apparatus performs random access, the first location information is sent to the communication apparatus, and after the communication apparatus performs random access, the encrypted second location information is sent to the communication apparatus. In another example, the first location information and the second location information may be sent to the communication apparatus at different moments. For example, before the communication apparatus performs random access, the first location information is sent to the communication apparatus, and after the communication apparatus performs random access, the second location information is sent to the communication apparatus.

Based on this solution, the location information of the satellite can be divided into the first location information and the second location information with different accuracy. The first location information and the second location information are sent to the communication apparatus, so that the communication apparatus can use the location information of the satellite with different accuracy in different processes of communicating with the satellite. In addition, the high-accuracy second location information can be encrypted by using the first key, to avoid that any communication apparatus can randomly obtain the second location information of the satellite.

In a possible implementation, the communication apparatus can obtain the first key used to decrypt the second location information, and decrypt the second location information of the satellite by using the first key.

Based on this solution, the communication apparatus can decrypt the second location information by using the first key, to obtain the second location information of the satellite, and the communication apparatus can perform uplink communication with the satellite based on the second location information.

In a possible implementation, the communication apparatus may further perform inter-satellite switching, for example, may switch from a serving satellite to a target satellite. The communication apparatus can obtain a second key used to decrypt second location information of the target satellite, and decrypt the second location information of the target satellite by using the second key.

Based on this solution, the communication apparatus can decrypt the second location information of the target satellite by using the second key, and then obtain the second location information of the target satellite, to perform uplink communication with the target satellite based on the second location information.

In a possible implementation, the first location information may be broadcast by the satellite. The second location information may be sent by the satellite by using first signaling, for example, signaling used for random access, media access control (MAC) signaling, or radio resource control (RRC) signaling. Alternatively, the first signaling may be added signaling dedicated to transmitting the second location information.

Based on this solution, the first location information may be broadcast. Therefore, the communication apparatus can perform random access to the satellite based on the broadcast information. The second location information is sent by using the first signaling, that is, needs to be unicast to the communication apparatus by the satellite. Therefore, a problem that any communication apparatus can obtain the second location information of the satellite can be avoided, and security of the second location information can be improved.

According to a second aspect, this application provides another communication method. The communication method may be performed by a communication satellite in an embodiment of this application. The satellite may send first location information to a communication apparatus, for example, may send location information and motion information of the satellite to a communication apparatus. The satellite sends second location information to the communication apparatus after the communication apparatus performs random access based on the first location information. It should be understood that, accuracy of a location obtained based on the second location information is higher than accuracy of a location obtained based on the first location information. The satellite can perform downlink communication with the communication apparatus based on the second location information.

In addition, it should be noted that, the location in this application may be a location of the satellite, or may be a location of the satellite and the motion information of the satellite.

Based on this solution, because in different processes in which the communication apparatus communicates with the satellite, required accuracy of location information and motion information of the satellite is different, the location information and motion information of the satellite may be distinguished in terms of different accuracy. The satellite may send location information and motion information of the satellite with different accuracy to the communication apparatus in different processes of communicating with the communication apparatus. In this way, accuracy of receiving an uplink signal by the satellite can be met, and a problem that high-accuracy location information and motion information of the satellite can be obtained by any communication apparatus can be avoided.

In a possible implementation, the first location information includes a basic orbital parameter of the satellite, or the first location information includes a basic orbital parameter and a perturbation parameter of the satellite.

Based on this solution, the satellite may send the basic orbital parameter and the perturbation parameter to the communication apparatus, so that the communication apparatus can determine the location information and motion information of the satellite based on the basic orbital parameter and the perturbation parameter.

In a possible implementation, the second location information is a correction parameter, where the correction parameter is used to correct the first location information.

Based on this solution, the second location information may be the correction parameter, and an amount of transmitted data may be reduced. In addition, it is also simple for the communication apparatus to calculate the location information and motion information of the satellite.

In a possible implementation, the first location information and the second location information are sent at a same moment, or the first location information and the second location information are sent at different moments, where the second location information is information encrypted by using a first key.

Based on this solution, the location information of the satellite can be divided into the first location information and the second location information with different accuracy. The first location information and the second location information are sent to the communication apparatus, so that the communication apparatus can use the location information of the satellite with different accuracy in different processes of communicating with the satellite. In addition, the high-accuracy second location information can be encrypted by using the first key, to avoid that any communication apparatus can randomly obtain the second location information of the satellite.

In a possible implementation, the satellite sends, to the communication apparatus, the first key used to decrypt the second location information.

Based on this solution, the communication apparatus can decrypt the second location information by using the first key, to obtain the second location information of the satellite, and the communication apparatus can perform uplink communication with the satellite based on the second location information.

In a possible implementation, the communication apparatus may further perform inter-satellite switching, for example, may switch from a serving satellite to a target satellite. The satellite may further send, to the communication apparatus, a second key used to decrypt second location information of the target satellite.

Based on this solution, before the communication apparatus performs inter-satellite switching, the satellite can notify the communication apparatus of the second key, so that the communication apparatus can decrypt the second location information of the target satellite by using the second key, then, obtain the second location information of the target satellite, and can communicate with the target satellite based on the second location information.

In a possible implementation, that the satellite sends the first location information to the communication apparatus includes: The satellite broadcasts the first location information. Sending the second location information to the communication apparatus includes: The satellite sends the second location information to the communication apparatus by using first signaling, where the first signaling is one of the following: signaling used for random access, media access control (MAC) signaling, or radio resource control (RRC) signaling.

Based on this solution, the first location information may be broadcast. Therefore, the communication apparatus can perform random access to the satellite based on the broadcast information. The second location information is sent by using the first signaling, that is, needs to be unicast to the communication apparatus by the satellite. Therefore, a problem that any communication apparatus can obtain the second location information of the satellite can be avoided, and security of the second location information can be improved.

According to a third aspect, a communication apparatus is provided. The communication apparatus provided in this application has a function of implementing behavior of the communication apparatus in the foregoing method according to the aspect, and includes a corresponding component configured to perform the steps or the functions described in the foregoing method according to the aspect. The steps or the functions may be implemented by using software, hardware (for example, a circuit), or a combination of hardware and software.

In a possible design, the foregoing apparatus includes one or more processors and a communication unit. The one or more processors are configured to support the apparatus in performing functions corresponding to the communication apparatus in the foregoing method, for example, perform random access to the satellite. The communication unit is configured to support the apparatus in communicating with another device, to implement a receiving and/or sending function, for example, receiving the first location information of the satellite or receiving the second location information of the satellite.

Optionally, the apparatus may further include one or more memories, and the memory is configured to be coupled to the processor, and stores necessary program instructions and/or data of a network device. The one or more memories may be integrated with the processor, or may be disposed independent of the processor. This is not limited in this application.

The apparatus may be a mobile phone, a tablet computer, or the like, and the communication unit may be a transceiver or a transceiver circuit. Optionally, the transceiver may alternatively be an input/output circuit or interface.

The apparatus may alternatively be a chip. The communication unit may be an input/output circuit or interface of a communication chip. The processor may be a logic circuit, and the logic circuit can process to-be-processed data based on the steps described in the foregoing method according to the aspect to obtain processed data. The to-be-processed data may be data received by the input circuit/interface, for example, first location information. The processed data may be data obtained based on the to-be-processed data, for example, a location obtained based on the first location information. The output circuit/interface is configured to output the processed data.

In another possible design, the foregoing apparatus includes a transceiver, a processor, and a memory. The processor is configured to control a transceiver or an input/output circuit to receive and send signals. The memory is configured to store a computer program. The processor is configured to run the computer program in the memory, so that the apparatus is enabled to perform the method completed by the communication apparatus according to any one of the first aspect or the possible implementations of the first aspect.

According to a fourth aspect, a communication satellite is provided. The communication satellite provided in this application has a function of implementing behavior of the satellite in the foregoing method according to the aspect, and includes a corresponding component (means) configured to perform the steps or the functions described in the foregoing method according to the aspect. The steps or the functions may be implemented by using software, hardware (for example, a circuit), or a combination of hardware and software.

In a possible design, the foregoing communication satellite includes one or more processors and a communication unit. The one or more processors are configured to support the apparatus in performing functions corresponding to the satellite in the foregoing method, for example, perform random access to the communication apparatus. The communication unit is configured to support the communication satellite in communicating with another device, to implement a receiving and/or sending function, for example, send the first location information to the communication apparatus.

Optionally, the communication satellite may further include one or more memories, and the memory is configured to be coupled to the processor, and stores necessary program instructions and/or data of a network device. The one or more memories may be integrated with the processor, or may be disposed independent of the processor. This is not limited in this application.

The communication unit may be a transceiver or a transceiver circuit. Optionally, the transceiver may alternatively be an input/output circuit or interface.

The communication satellite may alternatively be a chip. The communication unit may be an input/output circuit or interface of a communication chip. The processor may be a logic circuit, and the logic circuit can process to-be-processed data based on the steps described in the foregoing method according to the aspect to obtain processed data. The to-be-processed data may be data received by the input circuit/interface, for example, first location information. The processed data may be data obtained based on the to-be-processed data, for example, a location obtained based on the first location information. The output circuit/interface is configured to output the processed data.

In another possible design, the foregoing communication satellite includes a transceiver, a processor, and a memory. The processor is configured to control a transceiver or an input/output circuit to receive and send signals. The memory is configured to store a computer program. The processor is configured to run the computer program in the memory, so that the communication satellite performs the method completed by the satellite according to any one of the first aspect or the possible implementations of the first aspect.

According to a fifth aspect, a system is provided, where the system includes the foregoing communication apparatus and the communication satellite.

According to a sixth aspect, a computer-readable storage medium is provided, where the computer-readable storage medium is configured to store a computer program. The computer program includes instructions for performing the method according to any one of the first aspect or the possible implementations of the first aspect.

According to a seventh aspect, a computer-readable storage medium is provided, where the computer-readable storage medium is configured to store a computer program. The computer program includes instructions for performing the method according to any one of the second aspect or the possible implementations of the second aspect.

According to an eighth aspect, a computer program product is provided, where the computer program product includes computer program code. When the computer program code is run on a computer, the computer is enabled to perform the method according to any one of the first aspect or the possible implementations of the first aspect.

According to a ninth aspect, a computer program product is provided, where the computer program product includes computer program code. When the computer program code is run on a computer, the computer is enabled to perform the method according to any one of the second aspect or the possible implementations of the second aspect.

DESCRIPTION OF EMBODIMENTS

Figure 1:
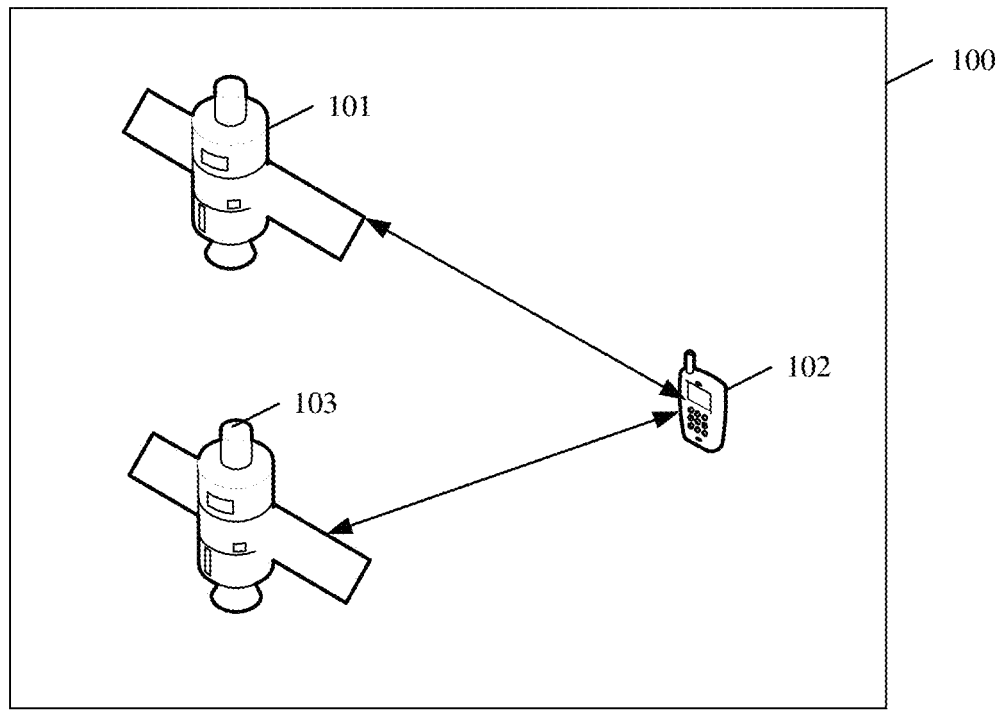
FIG. 1 is a schematic diagram of an architecture of a communication system according to an embodiment of this application.

To make objectives, technical solution, and advantages of embodiments of this application clearer, the following further describes embodiments of this application in detail with reference to the accompanying drawings.

The following describes some terms in embodiments of this application, to facilitate understanding of persons skilled in the art.

(1) A communication apparatus may also be referred to as a terminal, and may include a device providing voice and/or data connectivity to a user. The communication apparatus includes a device providing voice to the user, or includes a device providing data connectivity to the user, or includes a device providing voice and data connectivity to the user. For example, the communication apparatus may include a handheld device with a wireless connection function or a processing device connected to a wireless modem. The terminal can communicate with a core network through a radio access network (RAN), exchange voice or data with the RAN, or exchange voice and data with the RAN. The terminal may include UE, a wireless terminal, a mobile terminal, a device-to-device (D2D) communication terminal, a vehicle-to-everything (V2X) terminal, a machine-to-machine/machine-type communication (M2M/MTC) terminal, an internet of things (IoT) terminal, a subscriber unit, a subscriber station, a mobile station, a remote station, an access point (AP), a remote terminal, an access terminal, a user terminal, a user agent, a user device, or the like. For example, the terminal may include a mobile phone (or referred to as a "cellular" phone), a computer with a mobile terminal, a portable, pocket-sized, handheld, or computer built-in mobile apparatus, or the like. For example, the terminal may include a device such as a personal communications service (PCS) phone, a cordless phone, a session initiation protocol (SIP) phone, a wireless local loop (WLL) station, or a personal digital assistant (PDA). The terminal further includes a limited device, for example, a device having low power consumption, a device having a limited storage capability, or a device having a limited computing capability. For example, the terminal includes an information sensing device such as a barcode, radio frequency identification (RFID), a sensor, a global positioning system (GPS), or a laser scanner.

As an example instead of a limitation, in embodiments of this application, the terminal may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, bands, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement complete or partial functions without depending on smartphones, for example, smart watches or smart glasses, and devices that focus on only one type of application function and need to work with other devices such as smartphones, for example, various smart bands, smart helmets, or smart jewelry for monitoring physical signs.

If the various terminals described above are located in a vehicle (for example, placed in the vehicle or installed in the vehicle), the terminals may be all considered as vehicle-mounted terminals. For example, the vehicle-mounted terminal is also referred to as an on-board unit (OBU).

In embodiments of this application, the terminal may further include a relay. Alternatively, it is understood that, any device capable of data communication with a base station may be regarded as the terminal.

In this embodiment, the terminal may be an apparatus configured to implement a function of the terminal, or an apparatus capable of supporting the terminal in implementing the function, for example, a chip system. The apparatus may be installed in the terminal. In this embodiment, the chip system may include a chip, or may include a chip and another discrete component. In technical solutions provided in embodiments of this application, that the terminal is the apparatus configured to implement a function of the terminal is used as an example to describe the technical solutions provided in embodiments of this application.

(2) A basic orbital parameter may be a parameter in a satellite ephemeris, for example, a Kepler orbit parameter in the satellite ephemeris. Based on the satellite ephemeris, a running status of a satellite including time, a location, a velocity, and the like can be calculated, predicted, depicted, and tracked.

(3) A perturbation parameter may be a parameter reflecting satellite perturbation. Satellite perturbation refers to jitter of a satellite in an ideal orbit due to factors such as uneven mass distribution and non-spherical symmetry of the earth, gravity of the sun, the moon, and other celestial bodies, air resistance, and sunlight. Impact of a lunisolar diurnal tide and the like on the satellite may be further considered for the perturbation parameter.

The term "and/or" describes an association relationship for describing associated objects and represents that any one of three relationships may exist. For example, A and/or B may represent any one of the following three cases: Only A exists, both A and B exist, or only B exists. The character "/" usually indicates an "or" relationship between associated objects.

"A plurality of" in this application means two or more.

In addition, it should be understood that in description of this application, terms such as "first" and "second" are merely used for distinguishing and description, but should not be understood as indicating or implying relative importance, or should not be understood as indicating or implying a sequence.

In addition, the word "example" in embodiments of this application is used to represent giving an example, an illustration, or a description. Any embodiment or implementation solution described as an "example" in this application should not be construed as being more preferred or advantageous than another embodiment or implementation solution. Exactly, the used term "example" is intended to present a concept in a specific manner.

Currently, a satellite can provide a communication service for a terminal device. The satellite can notify the terminal device of location information and motion information of the satellite. The terminal device can calculate a location of the terminal device based on the location information and motion information of the satellite. In addition, the terminal device can further calculate relative location information and relative motion information between the terminal device and the satellite based on the location information and motion information of the satellite and the location of the terminal device, to determine a transmission latency and a Doppler frequency shift between the terminal device and the satellite. Therefore, when sending an uplink signal to the satellite, the terminal device can compensate for the transmission latency and the Doppler frequency shift, to reduce a time offset and a frequency offset of a signal received by the satellite, and further reduce difficulty in processing the received signal by the satellite. After receiving the uplink signal sent by the terminal device, the satellite can perform processing and make a decision based on the uplink signal, and send a decision result to the terminal device. For example, the terminal device may be indicated to perform inter-satellite switching and switch to a target satellite.

It should be noted that, at different stages of communication between the terminal device and the satellite, the satellite has different requirements for time-frequency accuracy of the uplink signal. In a stage in which the terminal device performs random access, the satellite can tolerate a relatively high time-frequency offset in an uplink direction. In a data communication stage, the satellite requires that an uplink signal sent by the terminal device can maintain relatively high time-frequency accuracy, to avoid inter-carrier interference (ICI) and inter-symbol interference (ISI) due to the time offset and/or the frequency offset, and further avoid impact on throughput in an uplink direction. Therefore, during data communication, the terminal device needs to know high-accuracy location information and motion information of the satellite.

However, the high-accuracy location information and motion information of the satellite are difficult to obtain, and are usually maintained and managed by an organization operating the satellite, and therefore are usually unavailable to the public in real time. If the high-accuracy location information and motion information of the satellite are directly broadcast to any terminal device, loss of control of information may be caused to an unauthorized terminal device. If only low-accuracy location information and motion information are notified to the terminal device, a capability of an accessed communication apparatus in terms of time-frequency compensation and the like is insufficient, thereby generating the ISI and the ICI.

In view of this, an embodiment of this application provides a communication method. The technical solutions in embodiments of this application may be applied to various communication systems, for example, a terrestrial communication system and a non-terrestrial communication system such as a satellite communication system. The satellite communication system may be integrated with a conventional mobile communication system. For example, the mobile communication system may be a fourth generation (4G) communication system (for example, a long term evolution (LTE) system), a worldwide interoperability for microwave access (WiMAX) communication system, a fifth generation (5G) communication system (for example, a new radio (NR) system), and a future mobile communication system.

For example, FIG. 1 is a schematic diagram of a possible architecture of a satellite communication system applicable to this application. If an analogy is made between the satellite communication system and a terrestrial communication system, a satellite may be considered as one or more network devices such as base stations on the ground. By using an access point 1, an access point 2, and even an access point 3 to an access point n (not shown in the figure), the satellite provides a communication service for a terminal device. The satellite may be further connected to a core network device (for example, an AMF). The satellite may be a non-geostationary orbit (NGEO) satellite or a geostationary orbit (GEO) satellite.

For ease of understanding of embodiments of this application, the following describes application scenarios of this application. Service scenarios described in embodiments of this application are intended to describe technical solutions of embodiments of this application more clearly, and do not constitute a limitation on the technical solutions provided in embodiments of this application. It may be learned by persons of ordinary skill in the art that, with emergence of a new service scenario, the technical solutions provided in embodiments of this application are also applicable to similar technical problems.

As shown in FIG. 1, a communication system 100 may include a satellite 101 and a communication apparatus 102. The satellite 101 and the communication apparatus 102 may be provided with a plurality of antennas. Optionally, the communication system may further include a satellite 103, and the satellite 103 may also be provided with a plurality of antennas.

It should be understood that the satellite 101 or the satellite 103 may further include a plurality of components related to signal transmission and reception (for example, a processor, a modulator, a multiplexer, a demodulator, and a demultiplexer).

In the communication system 100, both the satellite 101 and the satellite 103 may communicate with a plurality of communication apparatuses (for example, the communication apparatus 102 shown in the figure). The satellite 101 and the satellite 103 may communicate with one or more communication apparatuses similar to the communication apparatus 102. However, it should be understood that, a communication apparatus communicating with the satellite 101 and a communication apparatus communicating with the satellite 103 may be the same or different. The communication apparatus 102 shown in FIG. 1 may communicate with both the satellite 101 and the satellite 103. However, this shows only a possible scenario. In some scenarios, the communication apparatus may communicate with the satellite 101 or the satellite 103 only. This is not limited in this application.

As shown in FIG. 1, the satellite 101 can provide a communication service for the communication apparatus 102. The satellite 101 can transmit downlink data to the communication apparatus 102. The downlink data can be encoded through channel encoding. Data obtained after channel encoding can be transmitted to the communication apparatus 102 after constellation modulation. For example, the satellite 101 may indicate, in the downlink data, the communication apparatus 102 to perform measurement on a frequency. The communication apparatus 102 can transmit uplink data to the satellite 101. The uplink data can also be encoded through channel encoding. Encoded data can be transmitted to the satellite 101 after constellation modulation. For example, after performing measurement on the frequency indicated by the satellite 101, the communication apparatus 102 may send a measurement result to the satellite 101 by using the uplink data.

It should be understood that, FIG. 1 is only a simplified schematic diagram of an example for ease of understanding, and the communication system may further include another satellite or may further include another communication apparatus, which is not shown in FIG. 1.

Figure 2:
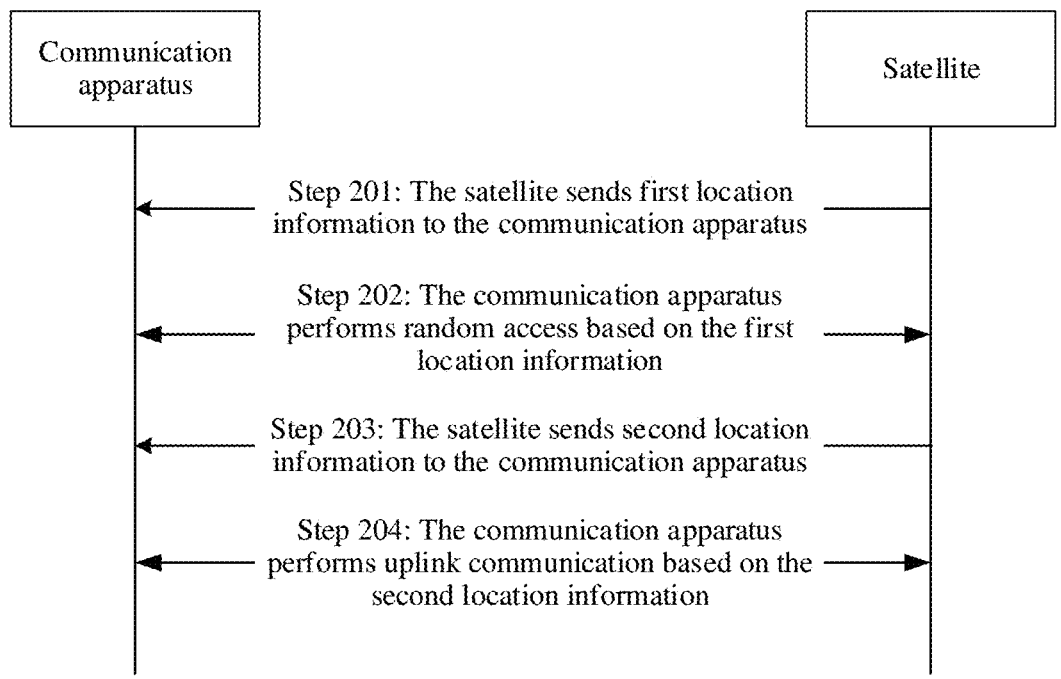
FIG. 2 is an example flowchart of a communication method according to an embodiment of this application.

FIG. 2 is a flowchart of a communication method shown from a perspective of device interaction according to an embodiment of this application. The following steps may be included:

Step 201: A satellite sends first location information to a communication apparatus.

The first location information herein may include location information and motion information of a satellite. The location information may be low-accuracy location information of the satellite. The motion information may be a low-accuracy motion velocity and motion direction of the satellite.

It should be noted that, the satellite may send the first location information through broadcasting. For example, the satellite may broadcast the first location information by using minimum system information. The minimum system information may be, for example, a SIB 1 in a system information block (SIB).

The following describes an implementation method of the first location information.

Example 1: The First Location Information May be Indicated in a Coordinate Form

The satellite and the communication apparatus may pre-agree with a specified coordinate system, or the satellite may send a specified coordinate system to the communication apparatus. When sending the specified coordinate system to the communication apparatus, the satellite may simultaneously or separately send the specified coordinate system and the first location information. The specified coordinate system herein may be an earth-centered earth-fixed (ECEF) coordinate system or an earth-fixed coordinate system (EFCS).

For the specified coordinate system, the satellite may use a coordinate vector (x, y, z) to represent a location of the satellite, and use a velocity vector $(v_x, v_y, v_z)$ to represent a motion velocity and a motion direction of the satellite. The ECEF coordinate system is an earth-fixed coordinate system with an earth center as an origin O. A Z-axis and an earth axis in parallel point to the north pole. An X-axis points to an intersection of the prime meridian and the equator. A Y-axis is perpendicular to an XOZ plane (that is, an intersection of the 90 degrees east longitude and the equator). In the ECEF coordinate system, the communication apparatus can determine the location, the motion direction, and the motion velocity of the satellite based on the coordinate vector and the velocity vector.

Example 2: The First Location Information May be Indicated by Using a Parameter

The satellite may use a basic orbital parameter to represent a location of the satellite, for example, a parameter stored in a satellite ephemeris. It should be understood that, a quantity of parameters, a physical meaning, and a formula may be pre-stored. For example, 16 parameters are used in a GPS system. Reference time and 15 parameters for the reference time may be used to represent the first location information. The 15 parameters include six orbital parameters and nine perturbation parameters. The communication apparatus can calculate the location information and motion information of the satellite based on the pre-stored formula and the 16 parameters.

Step 202: The communication apparatus performs random access based on the first location information.

When performing random access, the communication apparatus may use a conventional four-step random access method or may use a two-step random access method, which is not specifically limited in this application.

Step 203: The satellite sends second location information to the communication apparatus.

It should be noted that, accuracy of a location obtained based on the second location information is higher than accuracy of a location obtained based on the first location information. The location obtained based on the second location information may be a location obtained by the communication apparatus based on the second location information, or may be a location obtained by the communication apparatus based on the first location information and the second location information. The following describes an implementation of obtaining the location of the satellite based on the second location information.

It should be understood that, the location of the satellite in this embodiment may include the location of the satellite and the motion information of the satellite.

Example 1: The Location of the Satellite is Obtained Based on the Second Location Information (1) The second location information may indicate the location of the satellite in a coordinate form.

The satellite and the communication apparatus may preset a specified coordinate system, or the satellite may send a specified coordinate system to the communication apparatus. When sending the specified coordinate system to the communication apparatus, the satellite may simultaneously or separately send the specified coordinate system and the second location information. The specified coordinate system herein may be the ECEF, the EFCS, or the like.

The satellite may represent the location of the satellite by using a coordinate vector, and use a velocity vector to represent the motion velocity and the motion direction of the satellite. The communication apparatus can determine, in the specified coordinate system, the location, the motion velocity, and the motion direction of the satellite. It should be understood that, accuracy of the coordinate vector and the velocity vector herein is high.

(2) The second location information may indicate the location of the satellite by using a parameter.

The satellite can determine the location information and motion information of the satellite by using a high-accuracy basic orbital parameter and perturbation parameter. It should be understood that, a quantity of parameters, a physical meaning, and a formula may be pre-stored. For example, the satellite may add, to the second location information, reference time, and a basic orbital parameter and a perturbation parameter corresponding to the reference time. The communication apparatus can calculate the location of the satellite, the motion direction of the satellite, and the motion velocity of the satellite based on the reference time, the basic orbital parameter, and the perturbation parameter and by using the pre-stored formula.

Example 2: The Location of the Satellite is Obtained Based on the First Location Information and the Second Location Information The satellite may send an incremental parameter as the second location information to the communication apparatus by using an incremental notification method. The communication apparatus can determine a first location of the satellite based on the first location information, and after receiving the incremental parameter, can determine a second location of the satellite based on the location and the incremental parameter. For example, the communication apparatus can determine coordinates (x, y, z) of the satellite by using the first location information. After receiving the incremental parameter sent by the satellite, the communication apparatus can determine a high-accuracy location of the satellite based on the following Formula (1) to Formula (3):

$$x(t)=x+ax*t+bx*t^2+cx*t^3+ \qquad \text{Formula (1);}$$

$$y(t)=y+ay*t+by*t^2+cy*t^3+ \qquad \text{Formula (2); and}$$

$$z(t)=z+az*t+bz*t^2+cz*t^3+ \qquad \text{Formula (3), where}$$

(ax, bx, az, ay, by, bz, cx, cy, cz) are incremental parameters, and t represents an interval between time corresponding to the first location information and time corresponding to the second location information.

It should be understood that, the motion information of the satellite may also be sent to the communication apparatus by using a same method. For example, the communication apparatus can determine a velocity vector (vx, vy, vz) of the satellite based on the first location information. After receiving the incremental parameter sent by the satellite, the communication apparatus can further determine a high-accuracy velocity vector of the satellite.

Based on this solution, the satellite may send the second location information to the communication apparatus in a form of the incremental parameter. This can reduce a calculation amount, and a calculation process is simple.

After describing how the communication apparatus determines the location of the satellite based on the second location information, the following describes how the satellite sends the second location information.

Example 1: The Satellite May Simultaneously Send the First Location Information and The Second Location Information Before the communication apparatus performs random access, the satellite may simultaneously send the first location information and the second location information to the communication apparatus. For example, significant X bits may be used to carry the first location information, and remaining Y bits may be used to carry the second location information. The second location information herein may be information encrypted by using a first key. The satellite may broadcast the first location information and the encrypted second location information. Alternatively, the satellite may send the first location information and the encrypted second location information to the communication apparatus by using first signaling. The first signaling herein may be signaling used in an existing communication process, for example, RRC signaling, or may be added signaling, for example, signaling added and used to send the first location information and the encrypted second location information to the communication apparatus.

After receiving the first location information and the encrypted second location information, the communication apparatus can obtain the first location information through parsing. However, because the first key for encrypting the second location information is not obtained, the communication apparatus cannot obtain the second location information.

In an embodiment, the first key may be stored in a subscriber identity module (SIM) card placed inside the communication apparatus or stored in the communication apparatus. For example, after a user subscribes to a specific service, a network device sends the first key to the communication apparatus, and the communication apparatus may store the first key or store the first key in the SIM card. For another example, when the user performs random access at one time, the network device sends the first key to the communication apparatus, and the communication apparatus may store the first key or store the first key in the SIM card. In addition, it should be noted that, the first key may correspond to a validity period, for example, valid until XX month XX day or valid for one month. For example, when sending the first key to the communication apparatus, the network device may also send the validity period of the first key to the communication apparatus. In this way, the communication apparatus may know whether the first key expires, and when the first key expires, it is unnecessary for the communication apparatus to decrypt the second location information by using the expired first key. After the communication apparatus receives the encrypted second location information, if the communication apparatus determines that the first key expires, the communication apparatus may request the first key from the network device.

In addition, the communication apparatus may periodically detect whether the first key expires. For example, if the validity period is valid until XX month XX day, the communication apparatus may determine, based on a current date, whether the first key expires. After the first key expires, the communication apparatus may request the first key from the network device. In this way, after receiving the encrypted second location information, the communication apparatus can decrypt the second location information by using the first key, without encountering a problem that the communication apparatus cannot decrypt the second location information due to expiration of the first key.

Figure 3:
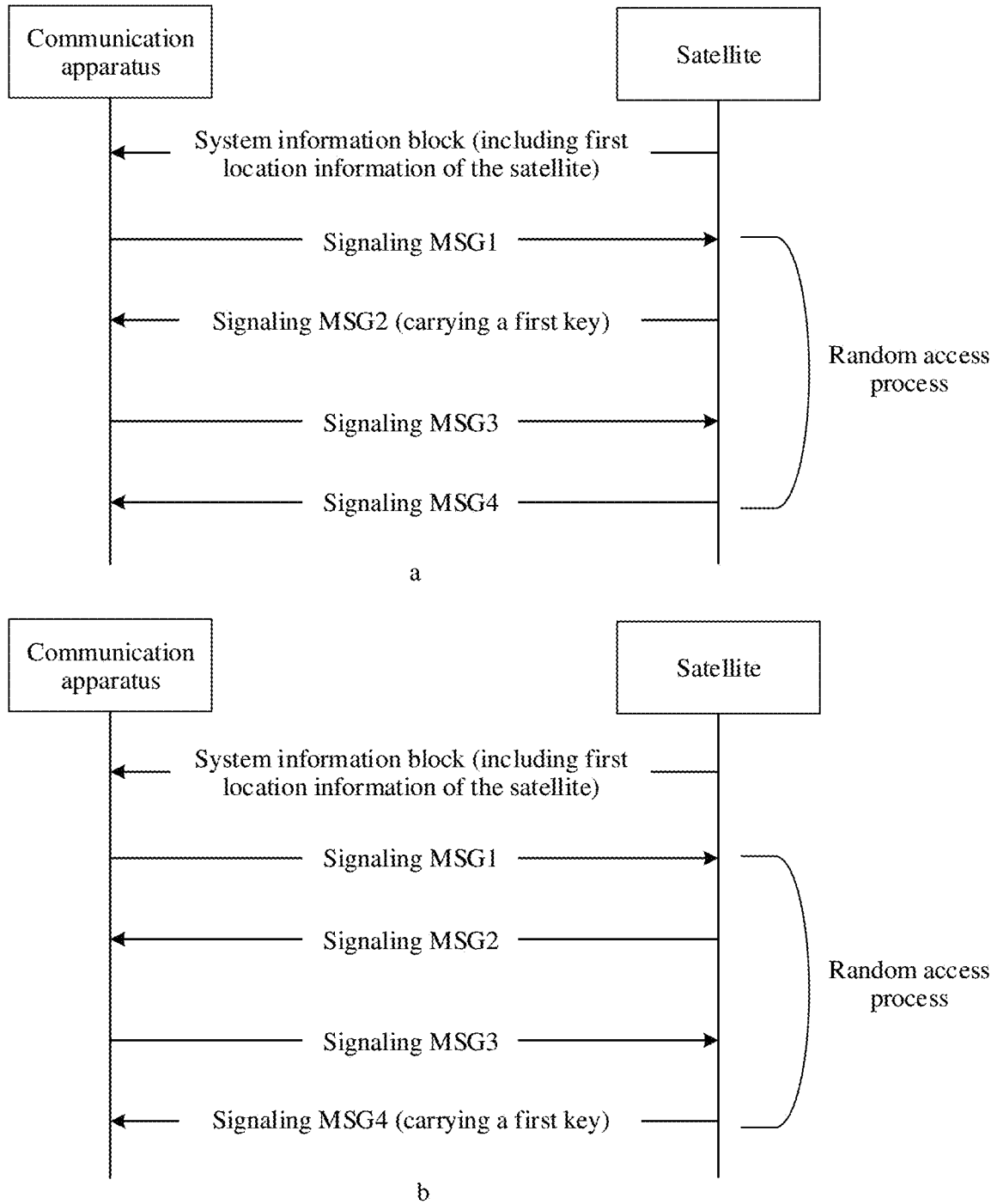
FIG. 3 is one of diagrams of a random access process of a communication apparatus according to an embodiment of this application.

In another embodiment, the satellite may send the first key to the communication apparatus when the communication apparatus performs random access. As shown in FIG. 3, the communication apparatus can perform random access by using a conventional four-step random access method. As shown in a in FIG. 3, the satellite may send the first key to the communication apparatus by using signaling MSG2. Alternatively, as shown in b in FIG. 3, the satellite may send the first key to the communication apparatus by using signaling MSG4.

Figure 4:
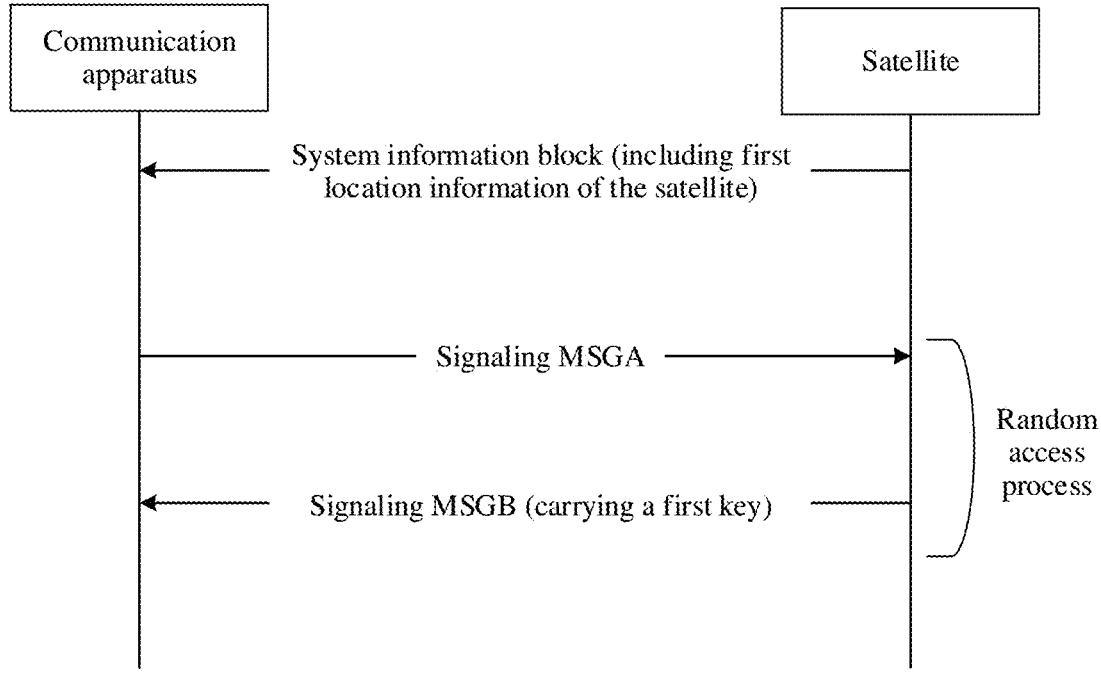
FIG. 4 is one of diagrams of a random access process of a communication apparatus according to an embodiment of this application.

As shown in FIG. 4, the communication apparatus may alternatively perform random access by using a two-step random access method. The satellite may send the first key to the communication apparatus by using signaling MSGB.

In addition, it should be noted that, the satellite may alternatively send the first key to the communication apparatus after the communication apparatus performs random access. For example, after receiving the first location information and the encrypted second location information, the communication apparatus can perform random access based on the first location information. After random access, the satellite may send the first key to the communication apparatus. Alternatively, the communication apparatus may further request the first key from the satellite after receiving the encrypted second location information.

It should be understood that, the first key provided in this embodiment may be an unencrypted first key, or may be a first key encrypted by using a specified key. For example, the satellite can encrypt the first key by using a public key, and send the encrypted first key to the communication apparatus. The communication apparatus can decrypt the first key by using a private key, to obtain the first key, and further decrypt the second location information. In this way, encrypting the first key can ensure that only a communication apparatus having a corresponding decryption key can obtain the first key.

Example 2: The Satellite May Separately Send the First Location Information and the Second Location Information Before the communication apparatus performs random access, the satellite may broadcast the first location information. In a process in which the communication apparatus performs random access, or after the communication apparatus performs random access, the satellite may send the second location information to the communication apparatus. The satellite may send the second location information by using the first signaling. The first signaling herein may be signaling used in an existing communication process, for example, RRC signaling, or may be added signaling, for example, signaling added and used to send the second location information to the communication apparatus.

In an embodiment, the second location information may be unencrypted information. When the communication apparatus performs random access based on the first location information, the satellite may send the second location information to the communication apparatus. For example, the satellite may send the second location information to the communication apparatus by using the signaling MSG2 or MSG4 in FIG. 3. Alternatively, the satellite may send the second location information to the communication apparatus by using the signaling MSGB in FIG. 4. In addition, after the communication apparatus performs random access based on the first location information, the satellite may further send the second location information to the communication apparatus. The communication apparatus can communicate with the satellite by using the second location information.

In another embodiment, the second location information may be encrypted information. The second location information herein may be information encrypted by using the first key. When the communication apparatus performs random access, the satellite may add the encrypted second location information to signaling used for random access, and send the encrypted second location information to the communication apparatus. For example, the encrypted second location information may be carried in the MSG2 or the MSG4, and sent to the communication apparatus. After random access of the communication apparatus is successful, the satellite may further send the encrypted second location information to the communication apparatus. For related descriptions of the first key and how the satellite sends the first key, reference may be made to the descriptions in Example 1, and details are not described herein again.

Step 204: The communication apparatus performs uplink communication based on the second location information.

After determining the high-accuracy location of the satellite based on the second location information, the communication apparatus can position the communication apparatus based on the location. In addition, the communication apparatus can further determine a transmission latency and a Doppler frequency shift of an uplink signal based on the location of the communication apparatus and the location of the satellite. In this way, the communication apparatus can perform time-frequency compensation on the uplink signal based on the transmission latency and the Doppler frequency shift.

In this embodiment, according to the foregoing method, location information of the satellite with different accuracy may be distinguished and sent to the communication apparatus. The communication apparatus can perform random access based on the low-accuracy location information, and can communicate with the satellite based on high-accuracy location information. This not only can meet a requirement for communication between the communication apparatus and the satellite, but also can ensure that the high-accuracy location information of the satellite is known by an authorized communication apparatus only.

Figure 5:
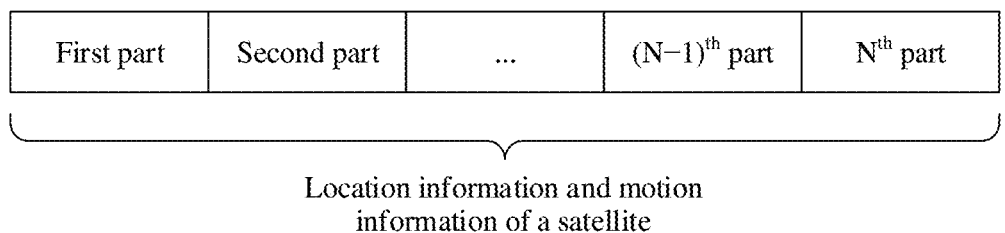
FIG. 5 is a schematic diagram of constituent parts of location information and motion information of a satellite according to an embodiment of this application.

It should be noted that, in an embodiment, the location information of the satellite provided in this embodiment may be divided into N parts with different accuracy, where N is a positive integer. As shown in FIG. 5, the satellite may divide the location information of the satellite into N different parts. Accuracy of a location obtained based on a second part is higher than accuracy of a location obtained based on a first part. Accuracy of a location obtained based on an $N^{th}$ part is higher than accuracy of a location obtained based on an $(N-1)^{th}$ part. In addition, a validity period of the location obtained based on the $N^{th}$ part is also longer than a validity period of the location obtained based on the $(N-1)^{th}$ pan.

The satellite may broadcast location information and motion information of the first part, and the communication apparatus can perform random access based on the first part. When the communication apparatus performs random access, or after the communication apparatus performs random access, the satellite may send location information and motion information of remaining several parts to the communication apparatus together, or the satellite may separately send location information and motion information of remaining several parts to the communication apparatus. It should be understood that, the first part herein may be equivalent to the first location information described above, and the second part to the $N^{th}$ part may be equivalent to the second location information described above. For a sending method of the $N^{th}$ part information and an implementation method of the $N^{th}$ part information, reference may be made to the foregoing related descriptions of the second location information.

Figure 6:
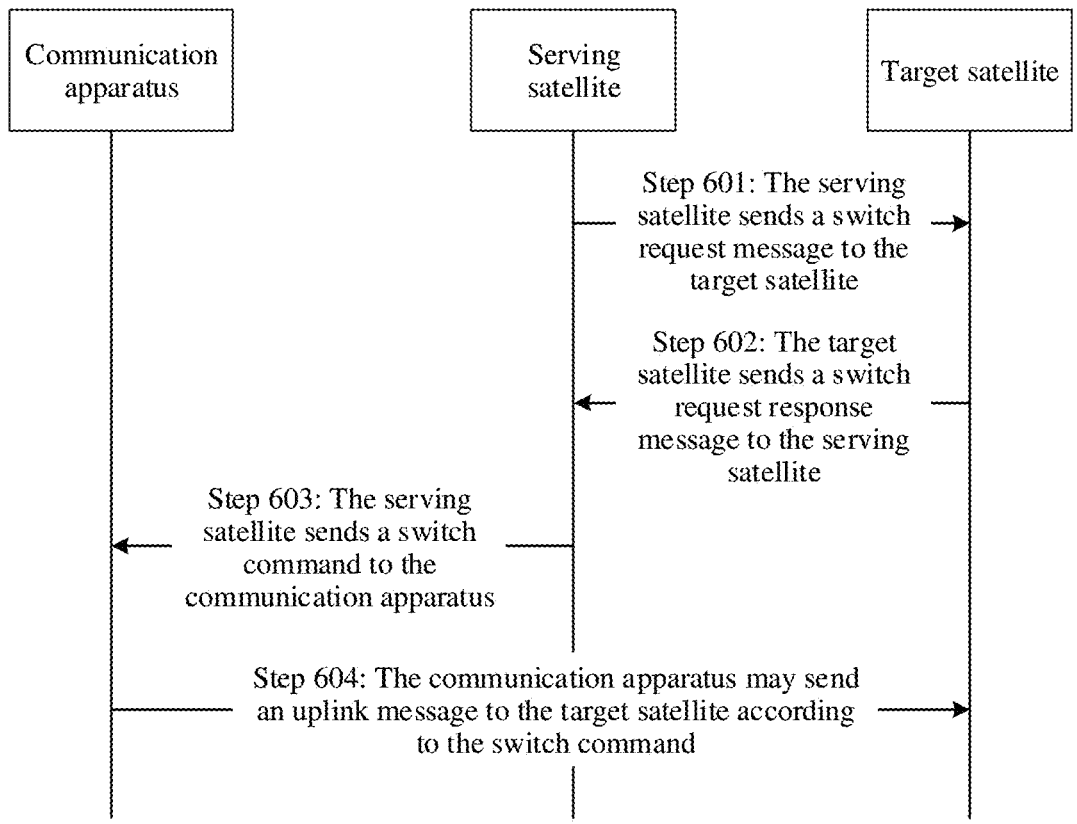
FIG. 6 is an example flowchart of performing inter-satellite switching by a communication apparatus according to an embodiment of this application.

Because the satellite rotates around the earth, after the satellite rotates to a particular location, communication quality between the communication apparatus and the satellite is poor. In this case, the communication apparatus requests to perform inter-satellite switching. For example, the communication apparatus may request switching from a serving satellite (or a serving cell) to a target satellite (or a target cell). FIG. 6 is a schematic flowchart of performing inter-satellite switching by a communication apparatus according to an embodiment of this application. The following steps may be included:

Step 601: A serving satellite sends a switch request message to a target satellite.

The switch request herein may carry information such as an identifier of the communication apparatus, and may be used to request the target satellite to switch the communication apparatus from the serving satellite to the target satellite.

Step 602: The target satellite sends a switch request response message to the serving satellite.

The switch request response message herein may be used to indicate to allow the communication apparatus to switch to the target satellite. The switch request response message may carry first location information of the target satellite. Alternatively, the switch request response message may carry first location information and second location information of the target satellite. For implementation methods of the first location information and the second location information, reference may be made to the foregoing related descriptions, and no repeated description is provided. For example, the switch request response message may carry the first location information and encrypted second location information of the target satellite, and a second key used to encrypt the second location information of the target satellite.

Alternatively, the switch response message may carry only the first location information.

Step 603: The serving satellite sends a switch command to the communication apparatus.

The switch command herein may carry an identifier of the target satellite. The switch command may further carry the first location information of the target satellite. Alternatively, the switch command may further carry the encrypted second location information of the target satellite and the second key used to encrypt the second location information.

Step 604: The communication apparatus may send an uplink message to the target satellite according to the switch command.

The target satellite may add, to the switch request response message, the second key for encrypting the second location information, and the serving satellite may add the second key to the switch command and send the switch command to the communication apparatus. In an example, the switch command may further carry the encrypted second location information. The communication apparatus can decrypt the encrypted second location information by using the second key carried in the switch command, to obtain the second location information of the target satellite.

Based on this solution, when the communication apparatus performs inter-satellite switching, the serving satellite can notify the communication apparatus of the first location information, the second location information, and the like of the target satellite, so that the communication apparatus can communicate with the target satellite based on the location information from the serving satellite.

The foregoing describes the communication method in embodiments of this application, and the following describes a communication apparatus in embodiments of this application. The method and the apparatus are based on a same inventive concept. Because the method and the apparatus have a similar problem-resolving principle, for implementations of the apparatus and the method, refer to each other, and no repeated description is provided.

Figure 7:
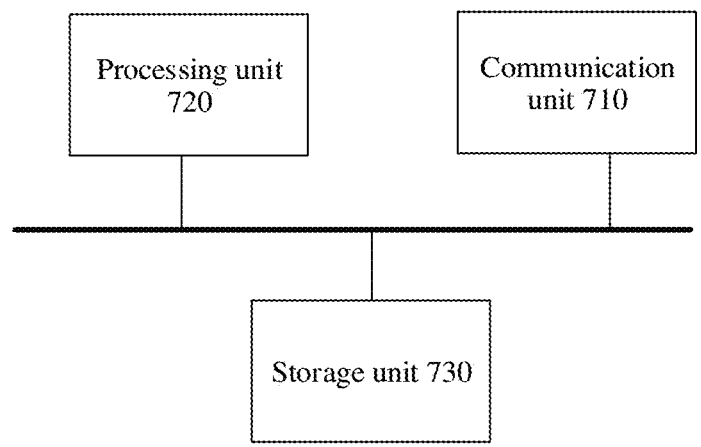
FIG. 7 is a schematic diagram of a communication apparatus according to an embodiment of this application.

Based on a same technical concept as the foregoing communication method, as shown in FIG. 7, a communication apparatus 700 is provided. The communication apparatus 700 can perform the steps performed by the terminal device in the foregoing method. To avoid repetition, details are not described herein. The communication apparatus 700 includes a communication unit 710 and a processing unit 720. Optionally, the communication apparatus 700 further includes a storage unit 730. The processing unit 720 may be separately connected to the storage unit 730 and the communication unit 710. The storage unit 730 may also be connected to the communication unit 710.

The storage unit 730 is configured to store a computer program.

For example, the communication unit 710 is configured to obtain first location information sent by a satellite. The processing unit 720 is configured to perform random access based on the first location information. The communication unit 710 is further configured to obtain second location information of the satellite, and perform uplink communication based on the second location information. Accuracy of a location obtained based on the second location information is higher than accuracy of a location obtained based on the first location information.

In a possible implementation, the first location information includes a basic orbital parameter of the satellite, or the first location information includes a basic orbital parameter and a perturbation parameter of the satellite.

In a possible implementation, the first location information further includes motion information of the satellite, and the motion information includes a motion velocity and a motion direction of the satellite.

In a possible implementation, the second location information is a correction parameter, where the correction parameter is used to correct the first location information.

In a possible implementation, the first location information and the second location information are sent at a same moment, or the first location information and the second location information are sent at different moments, where the second location information is information encrypted by using a first key.

In a possible implementation, the communication unit 710 is further configured to obtain the first key used to decrypt the second location information. The processing unit is further configured to decrypt the second location information of the satellite by using the first key.

In a possible implementation, the first key is pre-stored or the first key is sent by the satellite.

In a possible implementation, the communication unit 710 is further configured to obtain a second key used to decrypt second location information of a target satellite. The target satellite is a target satellite when the communication apparatus performs inter-satellite switching. The processing unit is further configured to decrypt the second location information of the target satellite by using the second key.

In a possible implementation, the first location information is broadcast by the satellite, and the second location information is sent by the satellite by using first signaling. The first signaling is one of the following: signaling used for random access, media access control (MAC) signaling, or radio resource control (RRC) signaling.

The communication apparatus may alternatively be a chip. The communication unit may be an input/output circuit or interface of the chip. The processing unit may be a logic circuit, and the logic circuit can process to-be-processed data based on the steps described in the foregoing method according to the aspect to obtain processed data. The to-be-processed data may be data received by the input circuit/interface, for example, the first location information. The processed data may be data obtained based on the to-be-processed data, for example, the location obtained based on the first location information. The output circuit/interface is configured to output the processed data.

Figure 8:
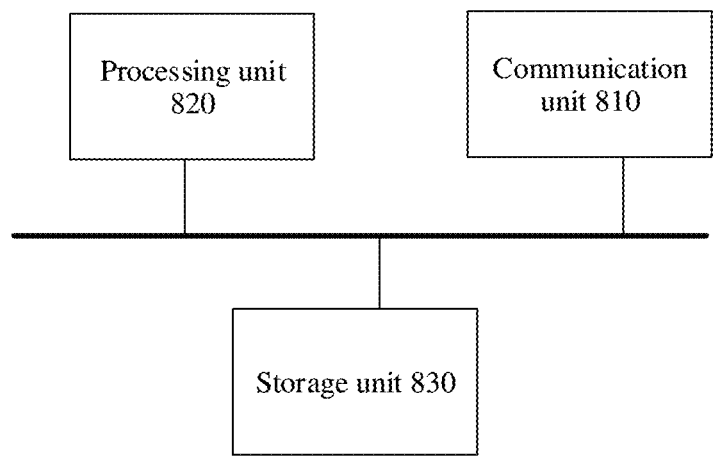
FIG. 8 is a schematic diagram of a communication satellite according to an embodiment of this application.

Based on a same technical concept as the foregoing communication method, as shown in FIG. 8, a communication apparatus 800 is provided. The communication apparatus 800 can perform the steps performed by the network device in the foregoing method. To avoid repetition, details are not described herein. The communication apparatus 800 may be a satellite or another network device, or may be a chip applied to a satellite or another network device. The communication apparatus 800 includes a communication unit 810 and a processing unit 820. Optionally, the communication apparatus 800 further includes a storage unit 830. The processing unit 820 may be separately connected to the storage unit 830 and the communication unit 810. The storage unit 830 may also be connected to the communication unit 810.

The storage unit 830 is configured to store a computer program.

For example, the communication unit 810 is configured to send first location information to a communication apparatus. The processing unit 820 is configured to perform random access to the communication apparatus. The communication unit 810 is further configured to: after the communication apparatus performs random access based on the first location information, send second location information to the communication apparatus, and perform downlink communication with the communication apparatus based on the second location information. Accuracy of a location obtained based on the second location information is higher than accuracy of a location obtained based on the first location information.

In a possible implementation, the first location information further includes motion information of the satellite, and the motion information includes a motion velocity and a motion direction of the satellite.

In a possible implementation, the second location information is a correction parameter, where the correction parameter is used to correct the first location information.

In a possible implementation, the first location information and the second location information are sent at a same moment, or the first location information and the second location information are sent at different moments, where the second location information is information encrypted by using a first key.

In a possible implementation, the communication unit 810 is further configured to send, to the communication apparatus, the first key used to decrypt the second location information.

In a possible implementation, the communication unit 810 is further configured to send, to the communication apparatus, a second key used to decrypt second location information of a target satellite. The target satellite is a target satellite when the communication apparatus performs inter-satellite switching.

In a possible implementation, the communication unit 810 is configured to broadcast the first location information, and send the second location information to the communication apparatus by using first signaling. The first signaling is one of the following: signaling used for random access, media access control (MAC) signaling, or radio resource control (RRC) signaling.

When the communication apparatus is a chip, the communication unit may be an input/output circuit or interface of the chip. The processing unit may be a logic circuit, and the logic circuit can process to-be-processed data based on the steps described in the foregoing method according to the aspect to obtain processed data. The to-be-processed data may be data received by the input circuit/interface, such as a received random access signal and uplink data initiated by a terminal. The processed data may be data obtained based on the to-be-processed data or downlink data that needs to be sent, such as the first location information and/or the second location information, or other downlink data. The output circuit/interface is configured to output the downlink data that needs to be sent.

Figure 9:
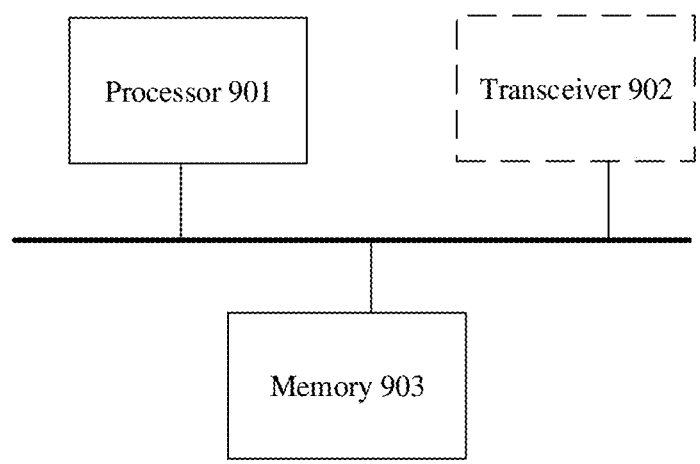
FIG. 9 is a block diagram of a communication apparatus according to an embodiment of this application.

FIG. 9 is a schematic block diagram of a communication apparatus 900 according to an embodiment of this application. It should be understood that, the communication apparatus 900 can perform the steps performed by the communication apparatus. To avoid repetition, details are not described herein. The communication apparatus 900 includes a processor 901 and a memory 903, and the processor 901 is electrically coupled to the memory 903.

The memory 903 is configured to store computer program instructions.

The processor 901 is configured to execute some or all of the computer program instructions in the memory. When the some or all of the computer program instructions are executed, the apparatus can perform random access to the satellite based on the first location information.

It should be understood that, the communication apparatus 900 shown in FIG. 9 may be a chip or a circuit, for example, the communication apparatus 900 may be a chip or a circuit disposed in a terminal device. A transceiver 902 may also be a communication interface. The transceiver includes a receiver and a transmitter. Further, the communication apparatus 900 may further include a bus system.

The processor 901, the memory 903, and the transceiver 902 are connected by using the bus system. The processor 901 is configured to execute the instructions stored in the memory 903, to control the transceiver to receive a signal and send a signal, and complete the steps performed by the communication apparatus in the communication method in this application. The memory 903 may be integrated into the processor 901, or may be disposed separately from the processor 901.

In an implementation, a function of the transceiver 902 may be implemented by using a transceiver circuit or a dedicated transceiver chip. The processor 901 may be implemented by using a dedicated processing chip, a processing circuit, a processor, or a general-purpose chip.

Figure 10:
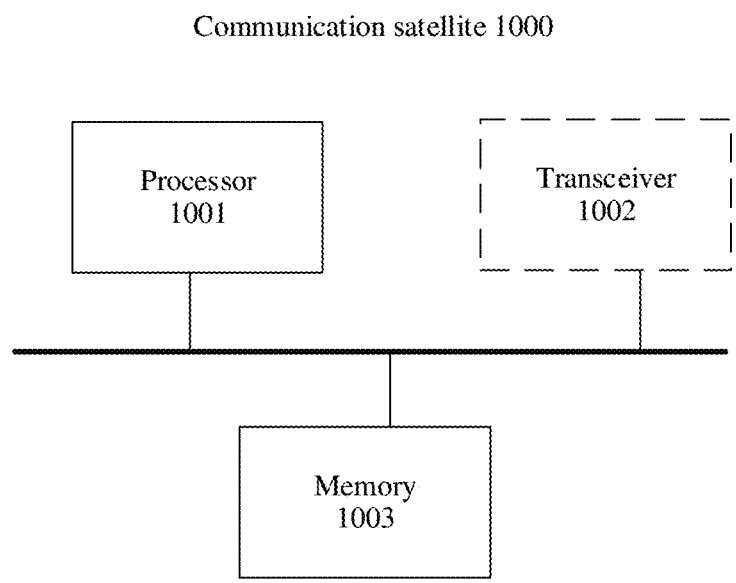
FIG. 10 is a block diagram of a communication satellite according to an embodiment of this application.

FIG. 10 is a schematic block diagram of a communication satellite 1000 according to an embodiment of this application. It should be understood that, the communication satellite 1000 can perform the steps performed by the network device. To avoid repetition, details are not described herein. The communication satellite 1000 includes a processor 1001 and a memory 1003, and the processor 1001 is electrically coupled to the memory 1003.

The memory 1003 is configured to store computer program instructions.

The processor 1001 is configured to execute some or all of the computer program instructions in the memory. When the some or all of the computer program instructions are executed, the communication satellite performs random access to a communication apparatus.

Optionally, the communication satellite 1000 further includes a transceiver 1002, configured to communicate with another device, for example, send first location information to the communication apparatus.

It should be understood that the communication satellite 1000 shown in FIG. 10 may be a chip or a circuit, for example, the communication satellite 1000 may be a chip or a circuit disposed in a network device. The transceiver 1002 may also be a communication interface. The transceiver includes a receiver and a transmitter. Further, the communication satellite 1000 may further include a bus system.

The processor 1001, the memory 1003, and the transceiver 1002 are connected by using the bus system. The processor 1001 is configured to execute the instructions stored in the memory 1003, to control the transceiver to receive a signal and send a signal, and complete the steps performed by the network device in the communication method in this application. The memory 1003 may be integrated into the processor 1001, or may be disposed separately from the processor 1001.

In an implementation, a function of the transceiver 1002 may be implemented by using a transceiver circuit or a dedicated transceiver chip. The processor 1001 may be implemented by using a dedicated processing chip, a processing circuit, a processor, or a general-purpose chip. When the communication apparatus is a chip, the transceiver 1002 may alternatively be an input/output circuit or interface of the chip.

The processor may be a central processing unit (CPU), a network processor (NP), or a combination of a CPU and an NP.

The processor may further include a hardware chip or another general-purpose processor. The hardware chip may be a logic circuit, an application-specific integrated circuit (ASIC), a programmable logic device (PLD), or a combination thereof. The PLD may be a complex programmable logic device (CPLD), a field-programmable gate array (FPGA), a generic array logic (GAL), another programmable logic device, a discrete gate or a transistor logic device, a discrete hardware component, or any combination thereof. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, a plurality of forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in this specification is intended to include but not limited to these memories and any memory of another appropriate type.

An embodiment of this application provides a computer storage medium, storing a computer program. The computer program includes computer executable instructions. When the computer executable instructions are run on a communication apparatus, the foregoing communication method can be performed.

An embodiment of this application provides a computer program product including instructions. When the computer program product runs on a computer, the communication method provided above is performed.

Persons skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, to enable a series of operations and steps to be performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

It is clear that persons skilled in the art can make various modifications and variations to embodiments of this application without departing from the scope of embodiments of this application. This application is intended to cover these modifications and variations of this application provided that they fall within the scope of the claims of this application and their equivalent technologies.

What is claimed is:

1. A communication method, comprising:
obtaining, by a communication apparatus, first location information broadcast by a satellite prior to random access, wherein the satellite is a serving satellite or a target satellite;
after obtaining the first location information, performing, by the communication apparatus, random access based on the first location information;
obtaining, by the communication apparatus, second location information sent by the satellite by using signaling used for the random a based on the first location information, wherein accuracy of a location obtained based on the second location information is higher than accuracy of a location obtained based on the first location information; and
performing, by the communication apparatus, uplink communication based on the second location information.

2. The method according to claim 1, wherein the first location information comprises a basic orbital parameter of the satellite, or the first location information comprises a basic orbital parameter and a perturbation parameter of the satellite.

3. The method according to claim 1, wherein the first location information further comprises motion information of the satellite, and the motion information comprises a motion velocity and a motion direction of the satellite.

4. The method according to claim 1, wherein the second location information is a correction parameter for correcting the first location information.

5. The method according to claim 1, wherein the first location information and the second location information are sent to the communication apparatus at different moments, wherein the second location information is encrypted by using a first key.

6. The method according to claim 5, further comprising:
obtaining, by the communication apparatus, the first key for decrypting the second location information; and
the obtaining, by the communication apparatus, second location information of the satellite comprises:
decrypting, by the communication apparatus, the second location information of the satellite by using the first key.

7. The method according to claim 6, wherein the first key is pre-stored or sent by the serving satellite.

8. A communication method, comprising:
broadcasting, by a serving satellite, first location information of a second satellite to a communication apparatus so that the communication apparatus performs random access based on the first location information, wherein the second satellite is the serving satellite or a target satellite;
sending, by the serving satellite, second location information to the communication apparatus by using signaling used for the random access after the communication apparatus performs random access based on the first location information, wherein accuracy of a location obtained based on the second location information is higher than accuracy of a location obtained based on the first location information; and
performing, by the serving satellite, downlink communication with the communication apparatus based on the second location information.

9. The method according to claim 8, wherein the first location information comprises a basic orbital parameter of the second satellite, or the first location information comprises a basic orbital parameter and a perturbation parameter of the second satellite.

10. The method according to claim 8, wherein the first location information further comprises motion information of the second satellite, and the motion information comprises a motion velocity and a motion direction of the second satellite.

11. The method according to claim 8, wherein the second location information is a correction parameter for correcting the first location information.

12. The method according to claim 8, wherein the first location information and the second location information are sent to the communication apparatus at different moments, wherein the second location information is encrypted by using a first key.

13. The method according to claim 12, further comprising:

sending, by the serving satellite to the communication apparatus, the first key for decrypting the second location information.

14. A communication system, comprising a communication apparatus and a serving satellite, wherein the communication apparatus is configured to:

obtain first location information broadcast by a satellite prior to random access, wherein the satellite is the serving satellite or a target satellite;

after obtaining the first location information, perform random access based on the first location information received from the satellite;

obtain second location information sent by the satellite by using signaling used for the random access performed based on the first location information, wherein accuracy of a location obtained based on the second location information is higher than accuracy of a location obtained based on the first location information; and perform uplink communication based on the second location information; and the serving satellite is configured to:

broadcast the first location information of a second satellite to the communication apparatus, wherein the second satellite is the serving satellite or the target satellite;

send the second location information to the communication apparatus after the communication apparatus performs the random access based on the first location information; and perform downlink communication with the communication apparatus based on the second location information.

15. The communication system according to claim 14, wherein the first location information comprises a basic orbital parameter of the satellite, or the first location information comprises a basic orbital parameter and a perturbation parameter of the satellite.

16. The communication system according to claim 14, wherein the first location information further comprises motion information of the satellite, and the motion information comprises a motion velocity and a motion direction of the satellite.

17. The communication system according to claim 14, wherein the second location information is a correction parameter for correcting the first location information.

18. The communication system according to claim 14, wherein the first location information and the second location information are sent to the communication apparatus at different moments, wherein the second location information is encrypted by using a first key.

* * * * *

UNITED STATES PATENT AND TRADEMARK OFFICE
CERTIFICATE OF CORRECTION

| | | |
|---|---|---|
| PATENT NO. | : 12,483,320 B2 | Page 1 of 1 |
| APPLICATION NO. | : 17/961812 | |
| DATED | : November 25, 2025 | |
| INVENTOR(S) | : Hejia Luo et al. | |

It is certified that error appears in the above-identified patent and that said Letters Patent is hereby corrected as shown below:

In the Claims

Column 23, Claim 1, Line 66, change "random a" to --random access performed--.

Signed and Sealed this
Twenty-third Day of December, 2025

John A. Squires
*Director of the United States Patent and Trademark Office*